United States Patent [19]

Macrander et al.

[11] 3,881,067

[45] Apr. 29, 1975

[54] ENDMARKING TECHNIQUE FOR SOLID STATE CROSSPOINT NETWORK

[75] Inventors: Max S. Macrander, Warrensville; Ronald F. Kowalik, Lombard; Gerald H. Fleischfresser, Chicago, all of Ill.

[73] Assignee: GTE Automatic Electric Laboratories Incorporated, Northlake, Ill.

[22] Filed: Mar. 4, 1974

[21] Appl. No.: 448,107

[52] U.S. Cl. .......................... 179/18 GF; 340/166 R
[51] Int. Cl. .......................... H04q 3/50
[58] Field of Search .......................... 179/18 GF

[56] References Cited

UNITED STATES PATENTS 3,819,867 6/1974 McCarthy et al. .............. 179/18 GF

*Primary Examiner*—William C. Cooper

[57] ABSTRACT

A telephone communication network for selecting a unique transmission path between any two network endpoints has a multiplicity of interconnected crosspoint switching stages providing a matrix of possible transmission paths between any two of the network endpoints and a like matrix of possible control paths having corresponding endpoints and interconnected crosspoint switch control means. The system also includes means for establishing an operating potential between the network endpoints of the desired path and means for providing coincident with the operating potential establishment a control signal between the corresponding control path endpoints. Because the control means are linked together, only the endpoints of the control path must be marked to select a unique transmission path.

14 Claims, 3 Drawing Figures

SINGLE WIRE CROSSPOINT

ENDMARKING TECHNIQUE FOR SOLID STATE CROSSPOINT NETWORK

BACKGROUND OF THE INVENTION

The present invention is directed in general to a system for selecting and establishing a unique transmission path from a plurality of possible matrixed transmission paths within a telephone communication network. The invention is more particularly directed to such a system which is less complex than prior art systems and wherein the path selection is made by marking only the endpoints of the selected path.

Telephone communication networks include a plurality of junctors by means of which the telephone subscriber interface circuits are linked. Generally there are fewer junctors than subscriber interface circuits but each completed call between two subscriber interface circuits will utilize a junctor. Intermediate to the junctor and subscriber interface circuit are a multiplicity of crosspoint switching stages made up of a plurality of crosspoint switches. The crosspoint switches are usually interconnected by transmission links forming a matrix of many possible transmission paths between any two endpoints of the network. These two endpoints are generally at a subscriber interface circuit and a junctor, there being fewer junctors than subscriber interface circuits.

The telephone networks of the prior art have additionally included means for controlling each crosspoint switch individually, there being a separate crosspoint marking means for each crosspoint switch. In such systems, in order to establish a unique transmission path between two network endpoints, between a given subscriber and a given junctor for example, it has been necessary to individually mark each crosspoint switch between the two endpoints. These networks are inherently complex due to the need to uniquely address and operate each crosspoint switch in the intended transmission path.

Other prior art includes end marked networks which make use of two terminal crosspoint elements in a progressive or fan-out technique. Networks employing this endmarking technique are subject to switching noise coupling in the transmission network because the transmission network itself is being continually switched as part of the path finding process. The noise generated by this process is particularly objectionable in a wide band switching network.

The same is even more evident in two wire RING and TIP balanced networks. Here, instead of just one transmission path being established, a transmission path pair must be established making such systems even more complex and noisy.

It is therefore a general object of the present invention to provide an improved network for selecting a unique transmission path between two endpoints of a telephone communication network.

It is a more specific object of the present invention to provide a telephone communication network for selecting a unique transmission path which is less complex than prior art systems.

It is a still more specific object of the present invention to provide a unique telephone communication network which requires path marking only at the selected endpoints of the system.

It is another object of the present invention to provide a balanced RING and TIP telephone communication network wherein unique transmission path pairs may be established by marking only selected endpoint pairs.

In general, the present invention provides a telephone communication network for connecting any two endpoints of the network comprising a multiplicity of crosspoint switching stages, each stage including a plurality of crosspoint switches and a corresponding plurality of crosspoint switch control means, a given one of the crosspoint switch control means being associated with a given respective one of the crosspoint switches. A plurality of transmission links interconnects the crosspoint switches to provide a matrix of possible transmission paths between any two of the network endpoints and a plurality of control links interconnects the control means in corresponding relation to the crosspoint switch interconnection to provide a like matrix of possible control paths having corresponding control path endpoints. The network additionally includes means for establishing an operating potential between a selected pair of the transmission path endpoints and means for establishing a control signal between the corresponding control path endpoints coincident with the operating potential establishment between the transmission path endpoints. When the operating potential and a control signal are coincidentally established between the corresponding transmission endpoints and control path endpoints, each control means within the selected path between the selected control path endpoints activates its corresponding crosspoints which in response to the control signal to thereby establish a unique transmission path between the selected transmission path endpoints.

The present invention additionally provides a balanced TIP and RING telephone communication network for connecting any two TIP and RING endpoint pairs of the network comprising a multiplicity of crosspoint switching stages, each stage including a plurality of TIP crosspoint switches, a corresponding plurality of RING crosspoint switches, a given one of the switches being associated with a respective given one of the RING crosspoint switches providing a plurality of TIP and RING crosspoint switch pairs and a plurality of TIP and RING crosspoint switch control means, a given one of the TIP crosspoint switch control means being associated with a respective given one of the TIP crosspoint switches and a given one of the RING crosspoint switch control means being associated with a respective given one of the RING crosspoint switches forming TIP and RING crosspoint switch control means pairs. A plurality of TIP and RING transmission links interconnects the TIP and RING crosspoint switch pairs to provide a matrix of possible TIP and RING transmission path pairs between any two pair of the network endpoint pairs and a plurality of control links interconnects the RING and TIP crosspoint switch control means pairs in corresponding relation to the RING and TIP crosspoint interconnections to provide a like matrix of possible control paths having endpoints corresponding with the RING and TIP transmission path endpoint pairs. The network additionally includes means for establishing an operating potential between a selected pair of the RING and TIP transmission endpoint pairs and means for establishing a control signal between the corresponding selected pair of control path endpoints coincident with the operating potential establishment between the RING and TIP transmission path endpoint pairs. When the operating potentials and the control signal are coincidentally established between corresponding RING and TIP transmission path endpoint pairs and the control path endpoints, each RING and TIP control means pair within the selected path between the selected control path endpoints activates its corresponding pair of RING and TIP crosspoint switches in response to the control signal to thereby establish a unique RING and TIP transmission path between the selected pair of transmission path endpoint pairs.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figures 1, 2:
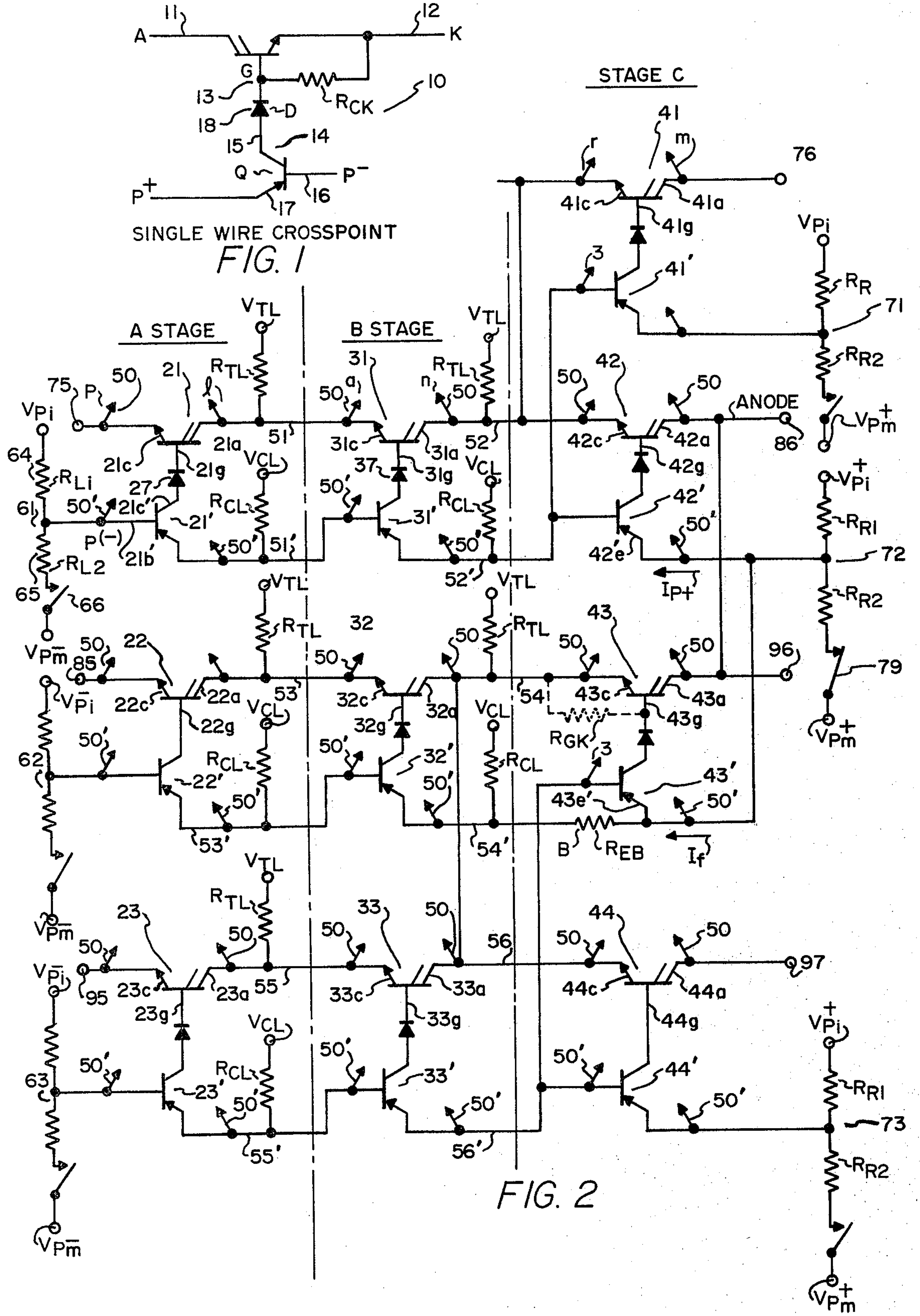
FIG. 1 is a schematic representation of a one wire crosspoint switch and crosspoint switch control means which may be utilized in practicing the present invention.
FIG. 2 is a schematic circuit diagram of a portion of a telephone communication network embodying the present invention.

FIG. 1 shows one type of crosspoint switch and associated crosspoint switch control means which may be utilized in practicing the present invention. The crosspoint switch comprises a silicon control rectifier (SCR) 10 having an anode 11, a cathode 12 and a gate 13. The associated control means comprises a transistor 14 having a collector 15, a base 16 and an emitter 17. Diode 18 couples the collector of transistor 14 to the gate 13 of the SCR 10.

As well known, in order to activate SCR 10, it is necessary to apply a potential between anode 11 and cathode 12 coincident with the injection of current into gate 13. To this end, the activation of the crosspoint switch ensues when a potential is applied across anode 11 and cathode 12 of SCR 10 coincident with the application of a potential between emitter 17 and base 16 of control transistor 14 to inject current out of collector 15 into the gate of the SCR 10. As well known, SCR 10 will conduct current until the current flowing from the anode to the cathode reaches a predetermined current level.

Many crosspoint switches and control means as just described may be utilized in practicing the present invention as shown in FIG. 2. FIG. 2 shows a portion of a telephone communication network of the type which has a multiplicity of crosspoint switching stages, including stage A, stage B and stage C which comprises a plurality of crosspoint switches. For example, stage A comprises crosspoint switches 21, 22 and 23. Stage B comprises crosspoint switches 31, 32 and 33 and stage C comprises crosspoint switches 41, 42, 43 and 44. Each of the crosspoint switches as previously described includes a cathode, a gate and an anode, each cathode, gate and anode being indicated by a corresponding number plus distinguishing *c*, *g* or *a* letter. For example, crosspoint switch 21 includes cathode 21*c*, anode 21*a* and gate 21*g*. Each of the cathodes 21*c*, 22*c*, 23*c* of crosspoint switches 21, 22 and 23 respectively are coupled to selected subscriber interface circuits at terminals 75, 85 and 95 which form one set of endpoints of the telephone communication network. At the other end of the network each of the anodes 41*a*, 42*a*, 43*a* and 44*a* of crosspoint switches 41, 42, 43 and 44 respectively are coupled to selected junctors at terminals 76, 86, 96 and 97 which form the other set of endpoints of the telephone communication network. In practical use there are fewer junctors than there are subscribers.

Each crosspoint switch is interconnected with immediately preceding and immediately succeeding crosspoint switches by transmission links 51–56 to provide a matrix of possible transmission paths between any two of the network endpoints. The arrows 50 at each anode and cathode indicate that the cathode and anode of each switch may be connected to any cathode and anode respectively of any switch of the same stage to further expand the matrix of possible transmission paths.

Associated with each crosspoint switch is a crosspoint switch control means transistor designated by a corresponding primed reference numeral. The crosspoint switch control transistors are interconnected by control links 51′–56′ corresponding in number to the number of transmission links and are interconnected in corresponding relation to the crosspoint switch interconnections. The arrows 50′ at each control transistor base and emitter indicate that the control transistors of each stage are interconnected corresponding to the crosspoint switch interconnections as indicated by the arrows 50. Therefore, there is provided a like matrix of possible control paths between the subscriber and junctor endpoints of the network. The base of each control transistor of stage A and the emitter of each control transistor of stage C comprise the control path subscriber and junctor endpoints respectively. As can be seen from the drawing, each transmission path endpoint has a corresponding control path endpoint.

Each control transistor at its collector is coupled to its associated crosspoint switch gate via a diode. For example, diode 27 couples control transistor 21′ at collector 21*c*′ is coupled to gate 21*g* of crosspoint switch 21.

Each of the control transistors of stage A is coupled to at least one of first control signal source means 61, 62 and 63. Each of the first control signal source means comprises a pair of resistors in serial connection with a switch. For example, control signal source means 61 comprises resistor 64, resistor 65 and switch 66. The base of control transistor 21′ is coupled to the junction of resistors 64 and 65. The other end of resistor 64 is coupled to a first voltage potential $V_{pi}$ and the other end of the series connection at switch 66 is coupled to a second voltage source $V_{pm}$. The closing of switch 66 produces at the base of transistor 21′ a negative voltage control signal represented by a voltage which is the difference between the magnitudes of the $V_{pi}$ and $-V_{pm}$ voltage sources.

At the other end of the control path and corresponding with each junctor is a second control signal source. These second control signal sources are designated 71, 72 and 73 and comprise a network similar to the first control signal source means and includes voltage sources V*pi* and +V*pm*. The closing of the second control signal source switches produces a positive control signal voltage equal to the difference between V*pi* and +V*pm*.

There are fewer second control signal sources than there are control path endpoints. However, each of the control path junctor endpoints is coupled to at least one of second control signal source means so that each junctor control path endpoint may be provided with a second control signal.

In operation, if a subscriber at transmission path endpoint 75 is to be connected to junctor endpoint 86 through the transmission path comprising crosspoint switches 21, 31, and 42, an operating potential is first established between terminal 86 at anode 42*a* of crosspoint switch 42 and terminal 75. Coincident with the operating voltage establishment, control signals are established between control path endpoints 42'*e* and control path endpoint 21'*b* by the closing of switches 79 and 66 respectively to thereby place a positive control signal between these control path endpoints. The coincident establishment of the control signals and operating potentials causes gate current from each control transistor to be injected into its corresponding crosspoint switch gate to thereby cause each associated crosspoint switch to conduct and to thereby complete the transmission path between transmission path endpoints 75 and 86.

Figure 3:
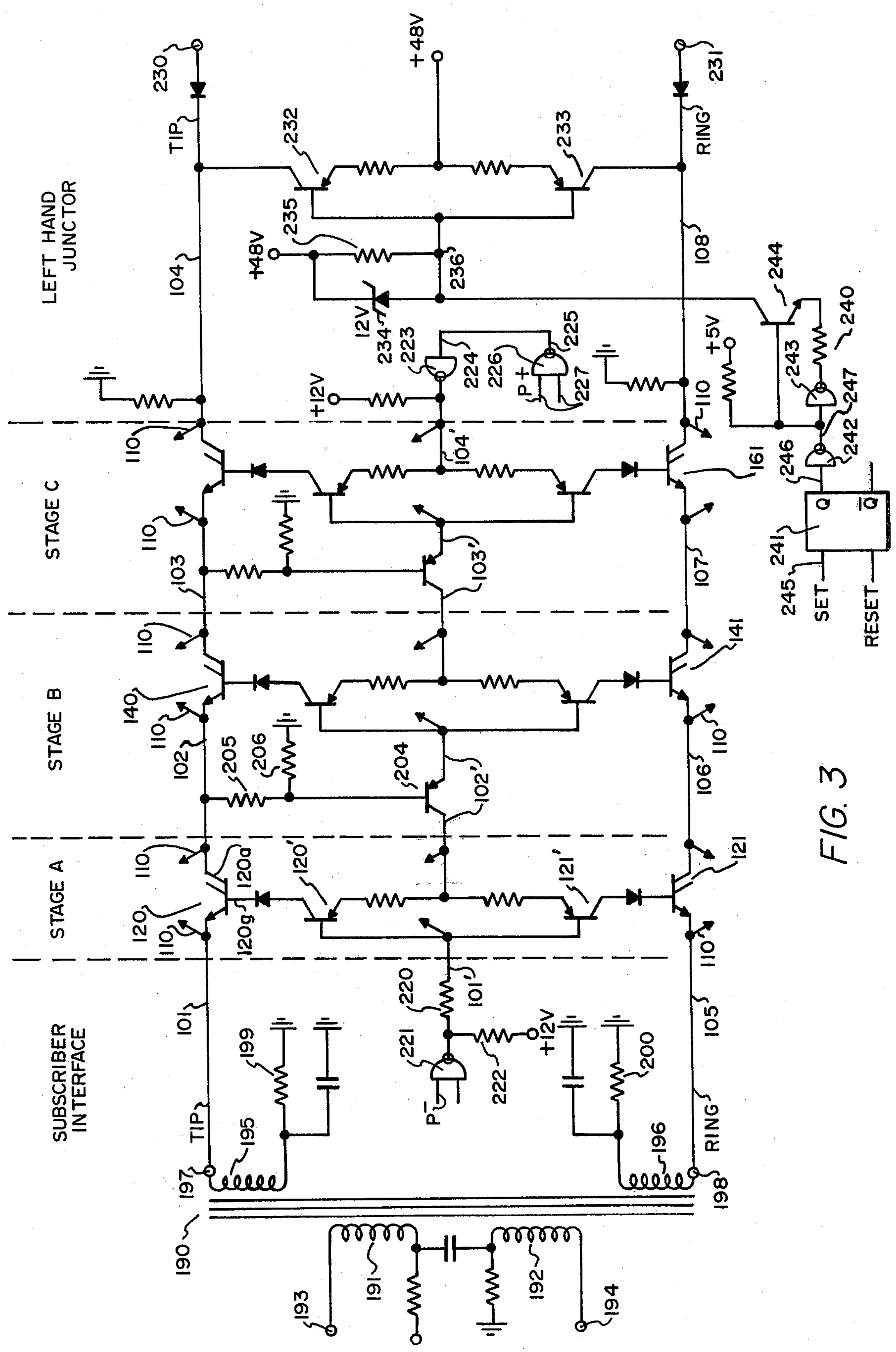
FIG. 3 is a schematic circuit diagram of a portion of a balanced RING and TIP telephone communication network showing another form which the present invention may take.

The busy or operating potential is selected to be of a higher potential than the control signal potential so that those control transistor diodes connected to a crosspoint having a cathode connected to a busy transmission link will be back biased and therefore preclude its associated control transistor from injecting gate current into its associated crosspoint switch. This is accomplished by the use of resistors at the network terminals as shown in FIG. 3 through resistors 199 and 200. The DC voltage developed across these resistors raises the voltage level of a busy link to IR where I is the current supplied by the junctor. For instance, in the example just described, if transmission link 51 was already a part of an established transmission path, the potential at cathode 31*c* would cause diode 37 to be back biased to thereby preclude gate current injection into gate 31*g*.

Because the control transistors are not able to sense a busy anode, the embodiment of FIG. 2 is most particularly adapted for use in a telephone network wherein available transmission path links are stored in a computer to thereby preclude the injection of gate current into a crosspoint switch having an idle cathode but a busy anode. Also, experience has shown that the fan-out current supplied from the control signal sources to the control transistor which are not in the selected control path is insufficient to cause their associated crosspoint switches from turning on. For instance, fan-out current $I_f$ to emitter 43'*e* is insufficient to cause enough gate current injection at gate 43*g* to cause crosspoint switch 43 to turn on. Therefore, it can be seen that the network of the present invention provides unique path selection merely by marking the network endpoints.

The network of FIG. 3 is a network which detects both busy cathodes and busy anodes for precluding gate current injection into crosspoint switches which are connected to busy transmission links. The network shown in FIG. 3 is also of the type for use in a two wire balanced TIP and RING transmission network, although the principle applies equally well to an unbalanced network. The network comprises stages A, B and C. Each stage comprises a plurality of RING and TIP crosspoint switch pairs, only one such pair for each stage being shown for simplicity. Stage A comprises TIP crosspoint switch 120 and RING crosspoint switch 121, stage B comprises TIP crosspoint switch 140 and RING crosspoint switch 141 and stage C comprises TIP crosspoint switch 160 and RING crosspoint switch 161. Therefore, each stage comprises a first plurality of TIP crosspoint switches and a corresponding plurality of RING crosspoint switches, a given one of the TIP crosspoint switches being associated with a respective given one of the RING crosspoint switches.

The stages are interconnected by TIP transmission links 101, 102, 103 and 104 and RING transmission links 105, 106, 107 and 108 to provide transmissin path pairs. The arrows 110 at each crosspoint switch cathode and anode designate corresponding RING and TIP interconnections of the crosspoint switches. In other words, selected crosspoint switch pairs of each stage are coupled to crosspoint switches pairs of immediately preceding and immediately succeeding stages to provide a matrix of possible transmission path pairs.

Transformer 190 of the subscriber interface has primary windings 191 and 192 inductively coupling the subscriber at terminals 193 and 194 to secondary windings 195 and 196 to give the subscriber access to the subscriber transmission path endpoints 197 and 198. Therefore, the subscriber coupled to primary windings 191 and 192 is inductively coupled to subscriber endpoint 197 on the TIP side and 198 on the RING side. Resistor 199 couples the other end of secondary winding 195 to ground and resistor 200 couples the other end of secondary winding 196 to ground.

Associated with each crosspoint switch of each stage is a crosspoint switch control means transistor. For example, crosspoint switch 120 of stage A has associated with it crosspoint switch control transistor 120' on the TIP side and crosspoint switch 121 has associated with it transistor 121' on the RING side. Therefore, each RING and TIP crosspoint switch pair has an associated RING and TIP control transistor pair. The control transistors are interconnected by control links 101' through 104' in corresponding relation to each of the interconnections of the RING and TIP crosspoint switch pairs. Therefore, there is a like matrix of possible control paths corresponding with the RING and TIP transmission path pairs.

The system additionally includes means for establishing control signals at the control path endpoints. Control link 101' is coupled to resistor 220 which is coupled to NAND gate 221. At the output of NAND gate 221 is another resistor 222 coupled to a +12 volt source. Control link 104' is coupled to the output of a first NAND gate 223 having an input 224 coupled to the output 225 of NAND gate 226. NAND gate 226 at its inputs 227 is coupled to its associated junctor for receiving control path selection inputs.

At the junctor end of the TIP and RING transmission paths are TIP and RING junctor terminals 230 and 231. For establishing an operating potential between the pair of transmission path endpoint terminals of the network, there is provided a source of operating potential. This source of operating potential comprises transistor 232 on the TIP side, transistor 233 on the RING side, zener diode 234 and an operating voltage control means 240. Control means 240 comprises flip-flop 241, NAND gate 242, NAND gate 243, transistor 244, and resistor 235.

Resistor 235 couples the +48 volt source to the bases of transistors 232 and 233 to maintain transistors 232 and 233 off when their associated transmission links 104 and 108 are not to be used. However, when transmission links 104 and 108 are to be used, an appropriate signal is applied to set input 245 causing Q output 246 to go low which in turn causes output 247 of NAND gate 242 to go high. This causes the base of transistor 244 to be forward biased due to the high potential at the base of transistor 244 and the resulting low output of NAND gate 243 at the emitter of transistor 244.

With transistor 244 conducting, the junction 236 of zener diode 234 and resistor 235 will be at 36 volts to forward bias transistors 232 and 233. Therefore, terminals 230 and 231 will be approximately at the same potential as junction 236 and will result in an operating potential being placed upon transmission links 104 and 108.

For detecting busy crosspoint switch anodes, there is a blocking transistor in series with each of the control links which interconnect the control transistor pairs between stages. Each blocking transistor is also coupled to a transmission path link associated with its control link. For example, control link 102′ includes blocking transistors 204 coupled in series at its collector and emitter within control link 102′. The base of blocking transistor 204 is coupled to TIP transmission link 102 through a resistor divider comprising resistor 205 and resistor 206. In this configuration, if anode 120*a* of crosspoint switch 120 and anode 121*a* of crosspoint switch 121 are busy, blocking transistor 204 will be back biased to preclude control transistors 120′ and 121′ from injecting gate current into the gates of their respective crosspoint switches.

To detect the busy condition of a crosspoint switch cathode, as in the embodiment of FIG. 2, each control transistor is coupled to its associated crosspoint switch gate by a diode. For example, diode 114 couples the collector of control transistor 120′ to gate 120*g* of crosspoint switch 120.

In operation, if a RING and TIP transmission path is desired between subscriber endpoints 197, 198 and junctor endpoints 230, 231, the operating control means 240 will function as previously described to forward bias transistors 232 and 233 to place the operating potential at terminals 230 and 231. Since the subscriber end of the TIP and RING transmission paths are coupled to ground through transformer secondaries 195 and 196 and resistors 199 and 200, the operating voltages will be established across the transmission path endpoints. Coincident with the establishment of the operating potentials, appropriate input signals will be applied to NAND gates 221 and 226 to cause the control transistor pairs in the corresponding desired control path to be forward biased and to inject gate current into their associated crosspoint switch gates. The coincident establishment of the operating potentials and the control signals therefore causes the crosspoint switches in the desired transmission path to conduct and to thereby establish a transmission path pair between subscriber endpoints 197, 198 and junctor endpoints 230 and 231.

If any one of the transmission link pairs were busy causing one pair of the crosspoint switches to have busy anodes the blocking transistor associated with that pair would be back biased to preclude their associated control transistors from injecting gate current into their corresponding crosspoint switches. For example, if transmission links 102 and 106 were busy, transistor 204 would be back biased effectively disconnecting control transistors 120′ and 121′ from the control signal source precluding them from injecting gate current into their associated crosspoint switches 120 and 121 respectively. Therefore it can be seen that in the system of the present invention only idle transmission links will be utilized in selecting a unique transmission path pair between any two network endpoint pairs.

The present invention therefore provides a telephone communication network for selecting a unique transmission path between any two network endpoints by merely marking the desired transmission path at the network endpoints. Therefore, each individual crosspoint need not be individually marked decreasing the complexity of such a telephone communication network. In addition, the present invention provides a network where busy transmission links may be detected so that only idle links are used in establishing the unique transmission path from the matrix of possible transmission paths. Also, the present invention may be incorporated into both single wire and double wire balanced TIP and RING telephone communication networks. Additionally, compared to conventional end marking networks the present invention provides a network with low noise characteristics.

While particular embodiments of the invention have been shown and described, modifications may be made, and it is intended in the appended claims to cover all such modifications as may fall within the spirit and scope of the invention.

We claim:

1. A telephone communication network for connecting any two endpoints of said network comprising:

a multiplicity of crosspoint switching stages, each said stage including a plurality of crosspoint switches and a corresponding plurality of crosspoint switch control means, a given one of said crosspoint switch control means being associated with a given respective one of said crosspoint switches;

a plurality of transmission links interconnecting said crosspoint switches to provide a matrix of possible transmission paths between any two of said network endpoints;

a plurality of control links interconnecting said control means in corresponding relation to said crosspoint switch interconnection to provide a like matrix of possible control paths having corresponding control path endpoints;

means for establishing an operating potential between a selected pair of said transmission path endpoints; and means for establishing a control signal between the corresponding control path endpoints coincident with said operating potential establishment between said transmission path endpoints; whereby when said operating potential and said control signal are coincidentally established between said corresponding transmission path endpoints and control path endpoints, each said control means within said selected path between said selected control path endpoints activates its corresponding crosspoint switch in response to said control signal to thereby establish a unique transmission path between said selected transmission path endpoints.

2. A network in accordance with claim 1 which additionally comprises blocking means within each control link in between each said stage, each said blocking means being responsive to the condition of the transmission link corresponding to its control link for inhibiting those crosspoint switch control means which are associated with crosspoint switches that are connected to busy transmission links.

3. A network in accordance with claim 2 wherein each said blocking means comprises a blocking transistor having a base, a collector and an emitter, said collector and said emitter of each said blocking transistor being connected in series within its respective control link and said base of each said blocking transistor being coupled to its associated transmission link.

4. A network in accordance with claim 3 where each said crosspoint switch comprises a silicon controlled rectifier having an anode, a cathode and a gate, and where said each blocking transistor base is coupled to the anode of its respective silicon controlled rectifier.

5. A network in accordance with claim 1 where each of said crosspoint switches comprises a silicon controlled rectifier having an anode, a cathode and a gate, said anode and said cathode of each said silicon controlled rectifier being connected to said transmission links and said gate of each said silicon controlled rectifier being coupled to its corresponding control means.

6. A network in accordance with claim 5 where each said control means comprises a transistor having a collector, an emitter and a base, said base and said emitter of each said transistor being connected to said control links and said collector of each said transistor being coupled to its respective silicon controlled rectifier gate.

7. A network in accordance with claim 5 where each said control means additionally comprises a diode, said diode being coupled between said collector of its associated transistor and said gate of said silicon controlled rectifier.

8. A balanced TIP and RING telephone communication network for connecting any two TIP and RING endpoint pairs of said network comprising:

a multiplicity of crosspoint switching stages, each said stage including a plurality of TIP crosspoint switches, a corresponding plurality of RING crosspoint switches, a given one of said TIP crosspoint switches being associated with a respective given one of said RING crosspoint switches providing a plurality of TIP and RING crosspoint switch pairs, and a plurality of TIP and RING crosspoint switch control means, a given one of said TIP crosspoint switch control means being associated with a respective given one of said TIP crosspoint switches and a given one of said RING crosspoint switch control means being associated with a respective given one of said RING crosspoint switches forming TIP and RING crosspoint switch control means pairs;

a plurality of TIP and RING transmission links interconnecting said TIP and RING crosspoint switch pairs to provide a matrix of possible TIP and RING transmission path pairs between any two pair of said network endpoint pairs;

a plurality of control links interconnecting the RING and TIP crosspoint switch control means pairs in corresponding relation to said RING and TIP crosspoint interconnections to provide a like matrix of possible control paths having endpoints corresponding with said RING and TIP transmission path endpoint pairs;

means for establishing an operating potential between a selected pair of said RING and TIP transmission endpoint pairs; and means for establishing a control signal between the corresponding selected pair of control path endpoints coincident with said operating potential establishment between said RING and TIP transmission path endpoint pairs; whereby when said operating potentials and said control signal are coincidentally established between corresponding RING and TIP transmission path endpoint pairs and said control path endpoints, each said RING and TIP control means pair within said selected path between said selected control path endpoints activates its corresponding pair of RING and TIP crosspoint switches in response to said control signal to thereby establish a unique RING and TIP transmission path between said selected pair of transmission path endpoint pairs.

9. A network in accordance with claim 8 which additionally comprises blocking means within each control link between each said stage, each said blocking means being associated with only one given TIP and RING crosspoint switch control means pair and responsive to the condition of the transmission link pair corresponding to its control link for inhibiting its RING and TIP crosspoint switch control means pair when said corresponding transmission link pair is busy.

10. A network in accordance with claim 9 where each said blocking means comprises a blocking transistor having a base, an emitter and a collector, said emitter and said collector of each said blocking transistor being connected in series within its respective control link and said base of each said blocking transistor being coupled to one of its associated transmission links.

11. A network in accordance with claim 10 where each said crosspoint switch comprises a silicon controlled rectifier having an anode, a cathode and a gate, and where each said blocking transistor base is coupled to the anode of one of its respective silicon controlled rectifier pairs.

12. A network in accordance with claim 8 where each of said crosspoint switches comprises a silicon controlled rectifier having an anode, a cathode and a gate, said anode and said cathode being connected to said transmission links and said gate of each said silicon controlled rectifier being coupled to its corresponding control means.

13. A network in accordance with claim 12 where each said control means comprises a transistor having a collector, an emitter and a base, said base and said emitter of each said transistor being connected to said control links and said collector of each said transistor being coupled to its respective silicon controlled rectifier gate.

14. A network in accordance with claim 13 where each said control means additionally comprises a diode, said diode being coupled between said collector and said gate of its respective silicon controlled rectifier.

* * * * *